(12) United States Patent
Wyers

(10) Patent No.: US 11,179,985 B1
(45) Date of Patent: Nov. 23, 2021

(54) MULTI-FUNCTION TRAILER HITCH AND GENERAL LOCK

(71) Applicant: Philip W. Wyers, Centennial, CO (US)

(72) Inventor: Philip W. Wyers, Centennial, CO (US)

(*) Notice: Subject to any disclaimer, the term of this patent is extended or adjusted under 35 U.S.C. 154(b) by 114 days.

(21) Appl. No.: 16/239,007

(22) Filed: Jan. 3, 2019

(51) Int. Cl.
*B60D 1/60* (2006.01)
*B62H 5/14* (2006.01)

(52) U.S. Cl.
CPC ............... *B60D 1/60* (2013.01); *B62H 5/145* (2013.01)

(58) Field of Classification Search
CPC ........... B60D 1/60; B60D 1/605; B62H 5/145
USPC ........ 70/14, 18, 19, 38 A, 38 B, 38 C, 38 R, 70/39, 232, 258, 52, 54–56; 248/551–553; 280/507, 511–514
See application file for complete search history.

(56) References Cited

U.S. PATENT DOCUMENTS

| | | | | |
|---|---|---|---|---|
| 1,978,391 | A * | 10/1934 | Stone ..................... | E05B 67/24 70/38 B |
| 3,884,055 | A * | 5/1975 | Vuillemot ................ | B60D 1/60 70/58 |
| 4,032,171 | A * | 6/1977 | Allen ...................... | B60D 1/60 280/507 |
| 4,064,716 | A * | 12/1977 | Shwayder ............... | E05B 67/22 70/38 A |
| 4,141,569 | A * | 2/1979 | Dilk ........................ | B60D 1/60 280/507 |
| 4,881,387 | A * | 11/1989 | Kortenbrede ........... | E05B 67/063 70/39 |
| 5,094,423 | A * | 3/1992 | Almquist ................. | B60D 1/60 248/156 |
| 5,189,893 | A * | 3/1993 | Kortenbrede ........... | E05B 67/24 70/379 R |
| 5,417,092 | A * | 5/1995 | Iu ........................... | E05B 67/063 70/38 A |
| 5,433,468 | A * | 7/1995 | Dixon ..................... | B60D 1/60 280/507 |
| 5,873,271 | A * | 2/1999 | Smith ...................... | B60D 1/60 280/507 |
| 6,666,051 | B1 * | 12/2003 | Li ........................... | B60D 1/60 280/507 |
| 6,694,781 | B1 * | 2/2004 | Li ........................... | B60D 1/06 280/507 |
| 6,698,256 | B2 * | 3/2004 | Witchey .................. | B60D 1/02 280/507 |
| 6,722,686 | B2 * | 4/2004 | Koy ........................ | B60D 1/06 280/507 |
| 6,802,523 | B1 * | 10/2004 | Profitt .................... | B60D 1/025 280/432 |

(Continued)

*Primary Examiner* — Lloyd A Gall
(74) *Attorney, Agent, or Firm* — Shaver & Swanson, LLP; Scott D. Swanson

(57) ABSTRACT

A multi-function trailer hitch lock and general purpose two piece U-shaped shackle lock has three components. An upper component is an upside down U-shaped shackle having at least one leg with locking grooves. For trailer use to engage the recess in the trailer coupler, a platform with a ball is slid up the U-shaped shackle legs. The third component is a separate locking assembly that is slid up the U-shaped shackle legs. This third component has a rotatable lock mechanism to drive a cam based latch mechanism between a latch state with the locking grooves, and an unlatch state. For general use such as locking a bicycle tire to a bike stand, the platform component is removed.

16 Claims, 10 Drawing Sheets

(56) References Cited

U.S. PATENT DOCUMENTS

| | | | | |
|---|---|---|---|---|
| 6,932,376 B1* | 8/2005 | Profitt | ............... | B60D 1/065 |
| | | | | 280/432 |
| 7,121,121 B2* | 10/2006 | Wyers | ............... | B60D 1/065 |
| | | | | 70/14 |
| 7,581,423 B2* | 9/2009 | Brojanac | ............... | E05B 17/002 |
| | | | | 70/423 |
| 9,796,229 B2* | 10/2017 | Yuan | ............... | E05B 67/36 |
| 9,855,804 B1* | 1/2018 | Kirkconnell | ............... | B60D 1/28 |
| 2005/0039498 A1* | 2/2005 | Budge | ............... | B60D 1/60 |
| | | | | 70/14 |
| 2014/0167391 A1* | 6/2014 | Elliott | ............... | B60D 1/60 |
| | | | | 280/507 |
| 2015/0123379 A1* | 5/2015 | Yuan | ............... | B60D 1/60 |
| | | | | 280/507 |

* cited by examiner

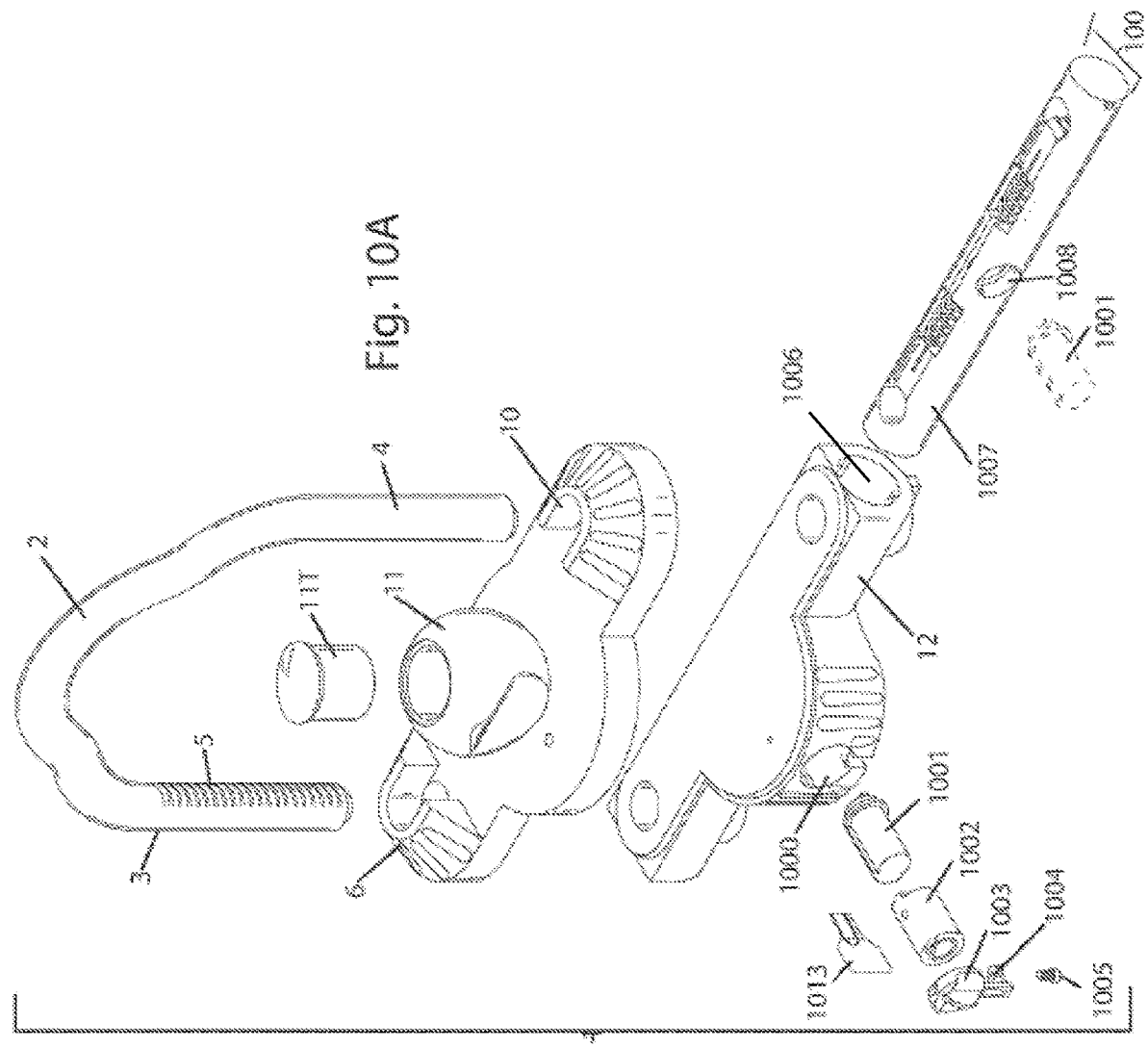

MULTI-FUNCTION TRAILER HITCH AND GENERAL LOCK

FIELD OF THE INVENTION

The present invention broadly concerns locking devices operative to prevent unauthorized access, theft or unauthorized use of objects. More particularly, however, the present invention is directed to a locking device to prevent the theft or unauthorized use of a trailer. The present invention specifically concerns a locking device which mates with the hitch recess in a trailer coupler so as to preclude access to that hitch and to secure the trailer to a stationary, relatively immoveable object. The removable ball platform provides a general purpose lock.

BACKGROUND OF THE INVENTION

The use of towable vehicles has become increasingly popular for both utilitarian and pleasure purposes. A wide variety of both tractor and trailer vehicles are employed for general or special purposes. Tractor vehicles, for example, include both those that travel on road, such as cars, sport utility vehicles, trucks, semi-tractors and a wide variety of farm and agricultural tractor equipment. Trailer vehicles, on the other hand, include utility trailers, commercial trailers, recreational vehicle trailers, boat trailers, camping trailers, to name a few.

One of the most common structures used to link a tractor vehicle to a trailer vehicle is the hitch ball and trailer coupler. Here, a mounting structure is provided on the tractor vehicle, and the mounting structure supports a generally spherical hitch ball in an upright manner. The trailer vehicle then includes a tongue associated with the frame of the trailer vehicle with this tongue having a forwardly extending hitch ball coupler that includes a recess that mateably receives the hitch ball and that can be secured thereto during the towing operation. During the towing operation, the hitch ball and the trailer hitch coupler are latched together to prevent inadvertent disengagement. In addition, it is known to provide the latch mechanisms of the trailer hitch coupler with a locking device so that the trailer can be locked onto the hitch ball.

However, when a trailer vehicle is disconnected from the towing vehicle, it may become the target of unauthorized use or theft. In such cases, a thief or other user may merely attach another towing vehicle to the trailer hitch coupler and drives away with the trailer vehicle. In order to deter theft, it is known to lock the trailer hitch coupler latch in an towing vehicle, it may become the target of unauthorized use or theft. In such cases, a thief or other user may merely attach another towing vehicle to the trailer hitch coupler and drives away with the trailer vehicle. In order to deter theft, it is known to lock the trailer hitch coupler latch in an unlatched condition so that it may not be secured in a normal manner to another tractor vehicle. However, the recess of the trailer hitch coupler is still available for mating with a hitch ball of a thief's tractor vehicle.

Accordingly, it is also known to provide a locking structure that engages the hitch ball recess of a trailer hitch coupler and locks onto the trailer hitch coupler so that the locking device interferes with the ability to attach a tractor vehicle. For example, U.S. Pat. No. 5,433,468 issued Jul. 8, 1995 to Dickson discloses a theft resistant device wherein a cylindrical member may be inserted into the recess of a trailer hitch coupler. A pair of arms is pivotally secured to this cylindrical member, on either side thereof, so that they may pivot across the top of the trailer hitch coupler and be secured by a lock shackle that may pass through openings in the free ends of the arms. This device, however, can be subject to attack by a thief and removed simply by hammering the arms out of alignment or breaking the arms off of the device so that the cylinder, and thus the locking device, may be removed from the trailer hitch coupler.

In U.S. Pat. No. 4,141,569, issued Feb. 27, 1979 to Dilk, another theft prevention device for use on a detached trailer vehicle is disclosed. Here, a hitch ball structure is mounted in a box-like housing that has a hinged lid. The hitch ball structure is positioned in the recess of a trailer hitch coupler, and the lid is then pivoted into place so as to trap the hitch coupler between the hitch ball structure and a downwardly depending post that is mounted to the lid. The lid may then be padlocked into a closed position. U.S. Pat. No. 4,032,171, issued Jan. 28, 1977 to Allen et al., teaches a somewhat similar technique of locking a trailer hitch coupler. Each of these devices is relatively bulky and complex, and again are subject to attack by a thief due to the exposed parts.

U.S. Pat. No. 3,884,055, issued May 20, 1975 to Vuillemot also locks into the recess of a trailer hitch coupler. Here, a cylindrical post is mounted to a U-shaped bracket with the post sized to be received in the recess. The legs of the bracket are provided with openings through which a bar that extends across the trailer hitch coupler and the post with this bar being locked in the bracket by means of a padlock. While this device is rather compact, it still exposes the locking structure to attack by a thief.

While the above-referenced devices do, in fact, lock onto a trailer hitch coupler, they suffer other disadvantages in addition to those noted above. For example, none of the devices disclosed in the above-referenced patents are readily adjustable for differently dimensioned trailer hitch couplers moreover, each relies on an independent padlock which can inadvertently be misplaced so that the locking structure becomes less useable until another padlock is obtained.

Accordingly, there remains a need for improved locks which may lock onto a trailer hitch coupler in order to discourage theft of a trailer vehicle when it is detached from a towing vehicle. There is a need for a device which is both compact, strong and durable such that the device resists attack by a would-be thief. There is further a need for such a locking device that has a locking mechanism incorporated therein so as to avoid the requirement of an auxiliary padlock.

Additionally the removal of a central platform for the ball that fits in the trailer hitch converts the trailer lock into a simple general lock, for example to lock a bicycle tire to a stand. Thus, a long sought need for an economic multipurpose trailer and bike or motorcycle lock has been met.

SUMMARY OF THE INVENTION

The main aspect of the present invention is to provide a multi-piece U-shaped lock that has a first mode to lock a trailer coupler recess and a second mode to remove a ball platform and provide a simple U-shaped lockable shackle for general purpose use.

Another aspect of the present invention is to allow a trailer owner to lock his bicycle (or scooter or motorcycle) to the rear of the trailer while in transit, then use the same lock to protect the trailer recess when unhitched, allowing the user to ride the bicycle in town.

Another aspect of the present invention is to provide a one size fits all plug as the ball on the platform to accommodate trailer couplers ranging from 1⅞ inch to 2 5/16 inch.

Another aspect of the present invention is to provide an aluminum construction of all three components.

Other aspects of this invention will appear from the following description and appended claims, reference being made to the accompanying drawings forming a part of this specification wherein like reference characters designate corresponding parts in the several views.

Campers often use a trailer with a rear platform to carry a bicycle or motorcycle. When the trailer is hitched to the tow vehicle, no need exists to protect the trailer from theft. However, the bicycle needs a lock. The present invention can be used in a two component mode to lock the bicycle to the trailer.

Once the trailer is unhooked from the tow vehicle, the trailer hitch recess needs a lock. The present invention provides this lock in a three component mode. The camper is free to ride his bicycle to town knowing his trailer is locked, and he avoided having to buy two separate locks.

BRIEF DESCRIPTION OF THE DRAWINGS

FIG. 10A is an exploded view of the lock assembly inside the locking base.

FIG. 10B. is an exploded view of the moving parts of the lock assembly.

Before explaining the disclosed embodiments in detail, it is to be understood that the embodiments are not limited in application to the details of the particular arrangements shown, since other embodiments are possible. Also, the terminology used herein is for the purpose of description and not of limitation.

DETAILED DESCRIPTION OF THE DRAWINGS

Figure 1:
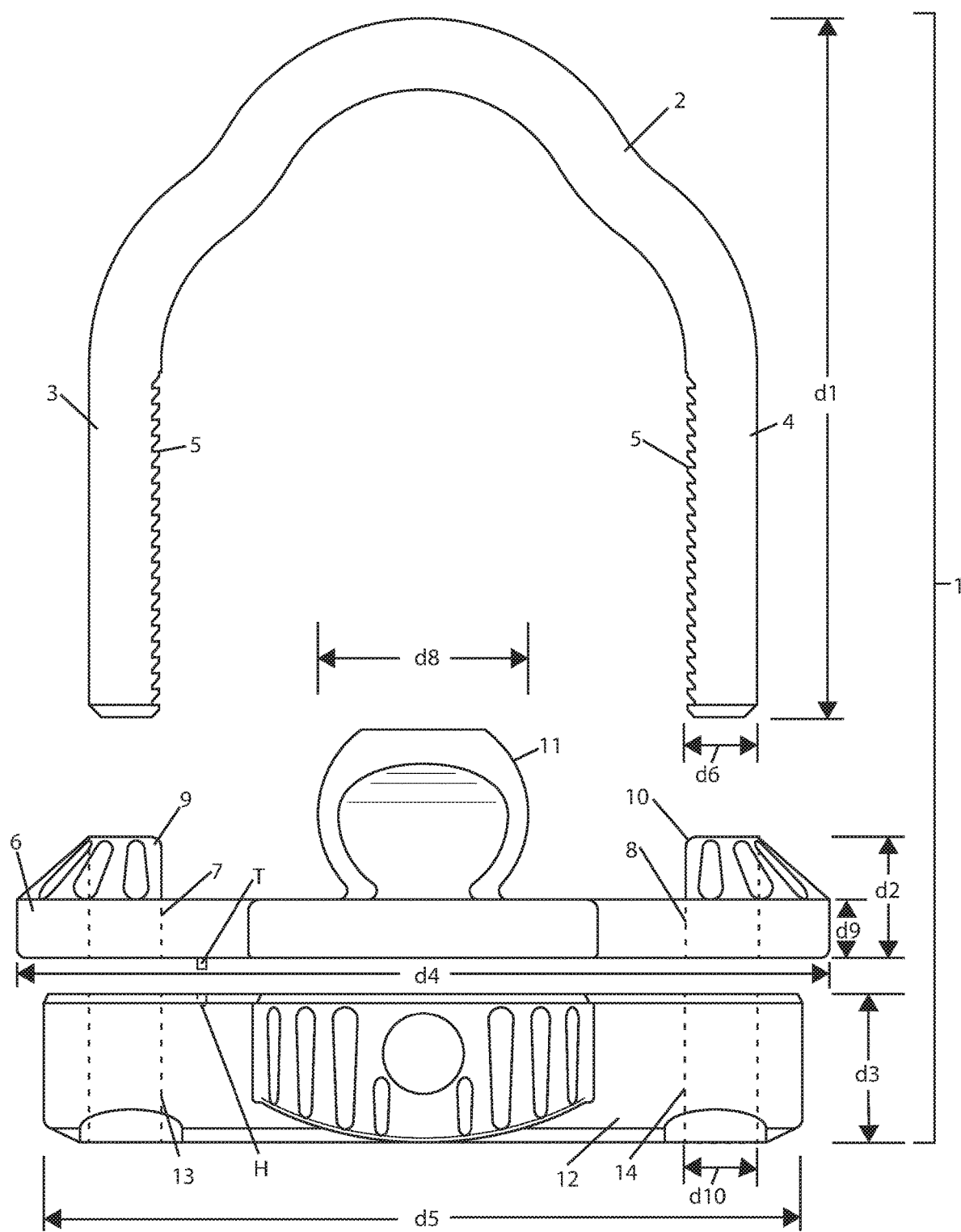
FIG. 1 is a front elevation exploded view of the three component first mode of the lock.

Referring first to FIG. 1 the three component trailer hitch lock 1 consists of a U-shaped shackle 2 having legs 3,4, each leg shown to have locking grooves 5. An equivalent design option could have only one leg 3 or 4 having the locking grooves 5. A plug platform 6 has smoothed holes 7,8 to receive legs 3,4.

Shoulders 9, 10 are optional. The plug 11 is a substitute for a towing ball. The plug 11 is sized to accommodate hitch recess diameters from 1⅞ to 2 5/16 inch. Preferably the plug platform 6 and plug 11 are made of one aluminum casting. Preferably the shackle 2 is also made of aluminum. An optional dowel pin(s) T can descend from the plug platform 6 to fit in a hole(s) H on top of the lock body 12, to deter physical cutting of the plug platform 6.

The lock body 12 has smoothed holes 13, 14 to receive legs 3, 4. The lock action is shown in FIGS. 10, 11A, 11B, 11C. All parts are aluminum, but the springs in FIG. 10 could be stainless steel. Nominal dimensions are $d1=9$ inches, $d2=1$ inch, $d3=1.5$ inch, $d4=8$ inch, $d5=7.5$ inch, $d6=9/16$ inch, $d8=1$ to $3$ inch, $d9=3/8$ inch, $d10=10/16$ inch.

Figure 2:
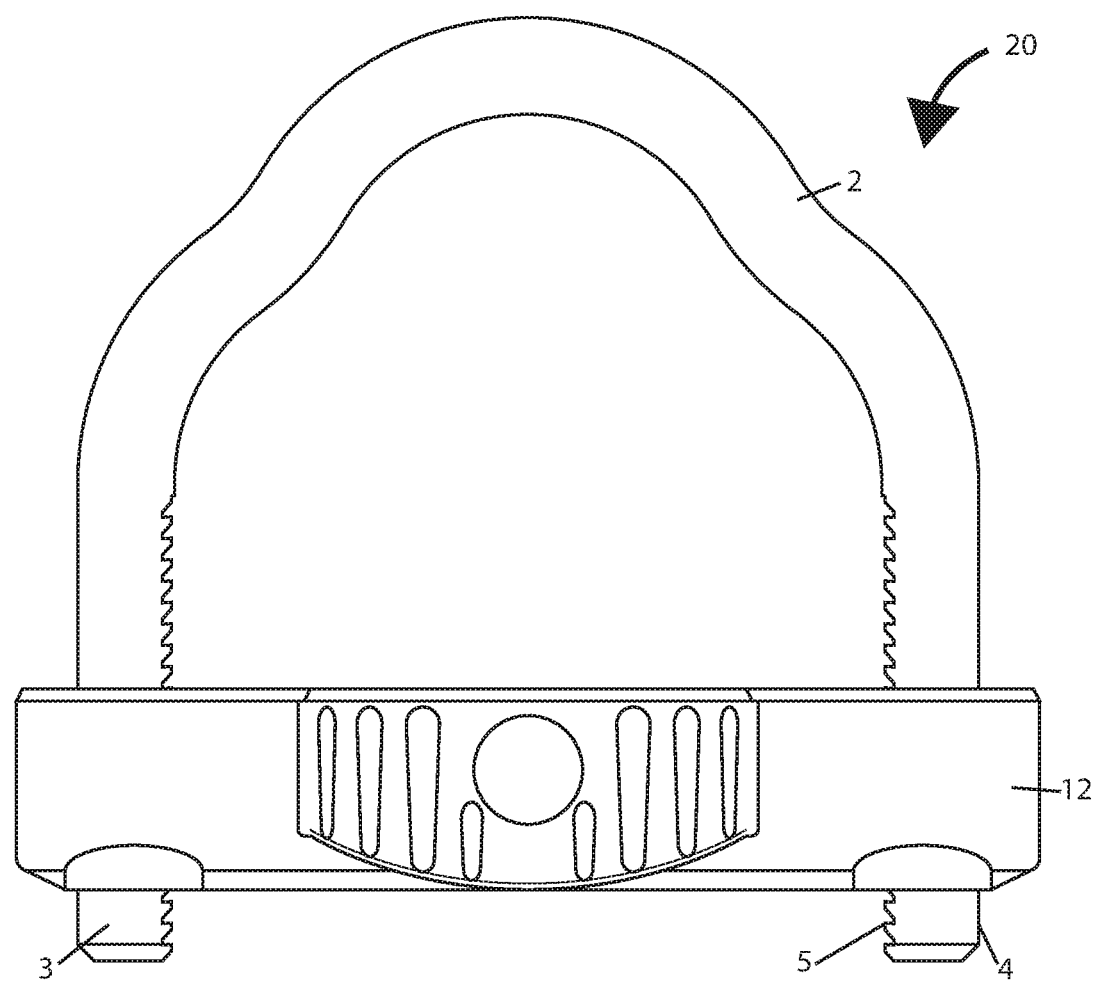
FIG. 2 is a front elevation view of the two component second mode of the lock.
Figure 3:
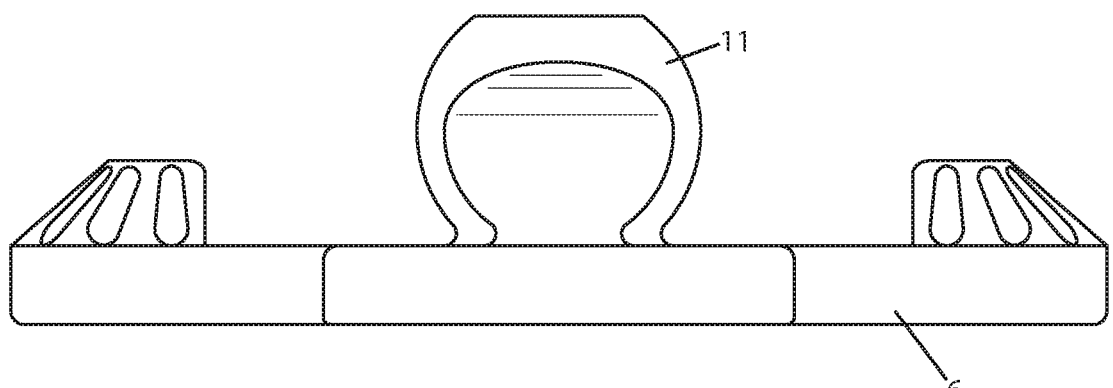
FIG. 3 is a front elevation view of the ball platform component.
Figure 12:
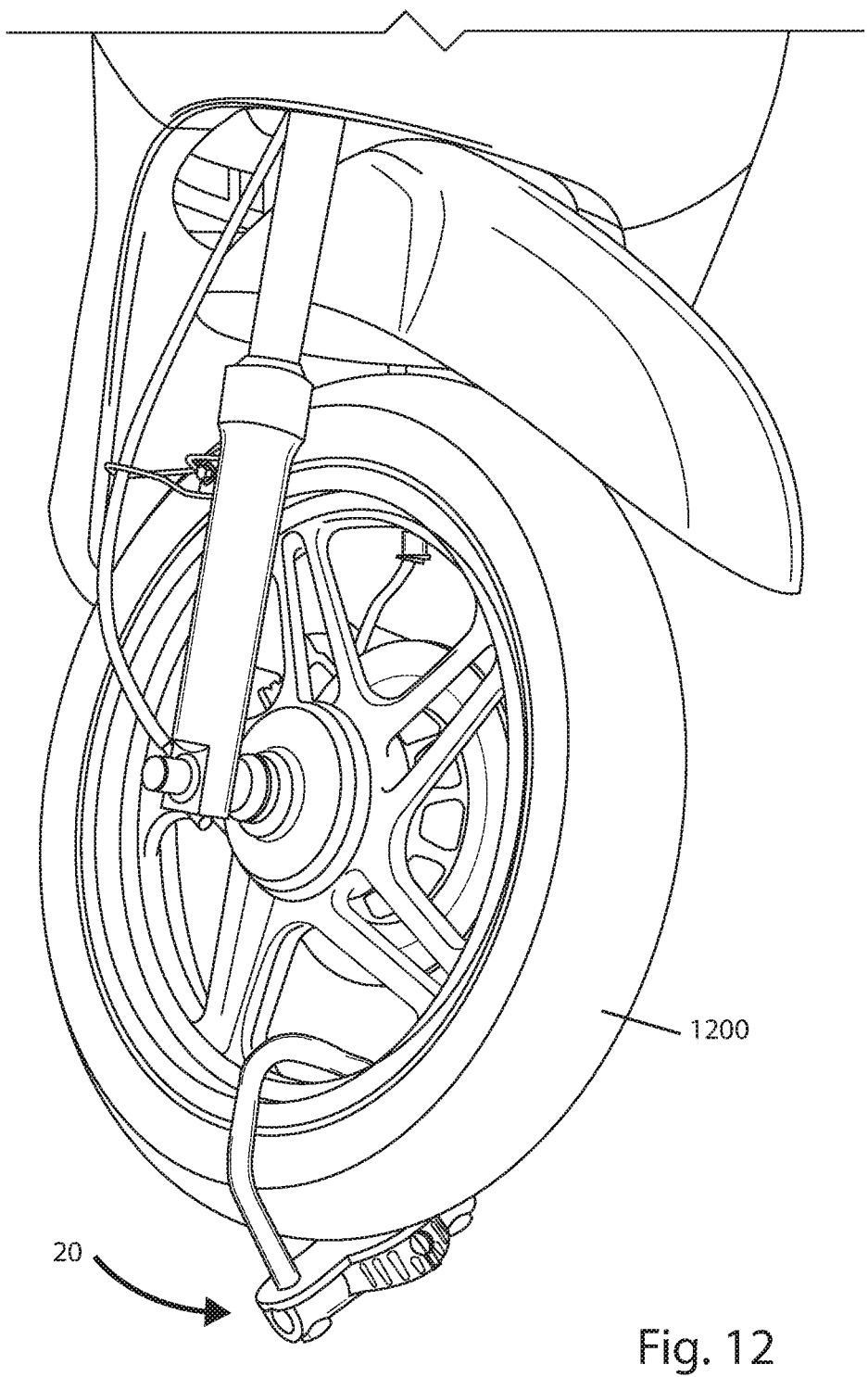
FIG. 12 is a top perspective view of the two piece lock on a motorcycle tire.
Figure 13:
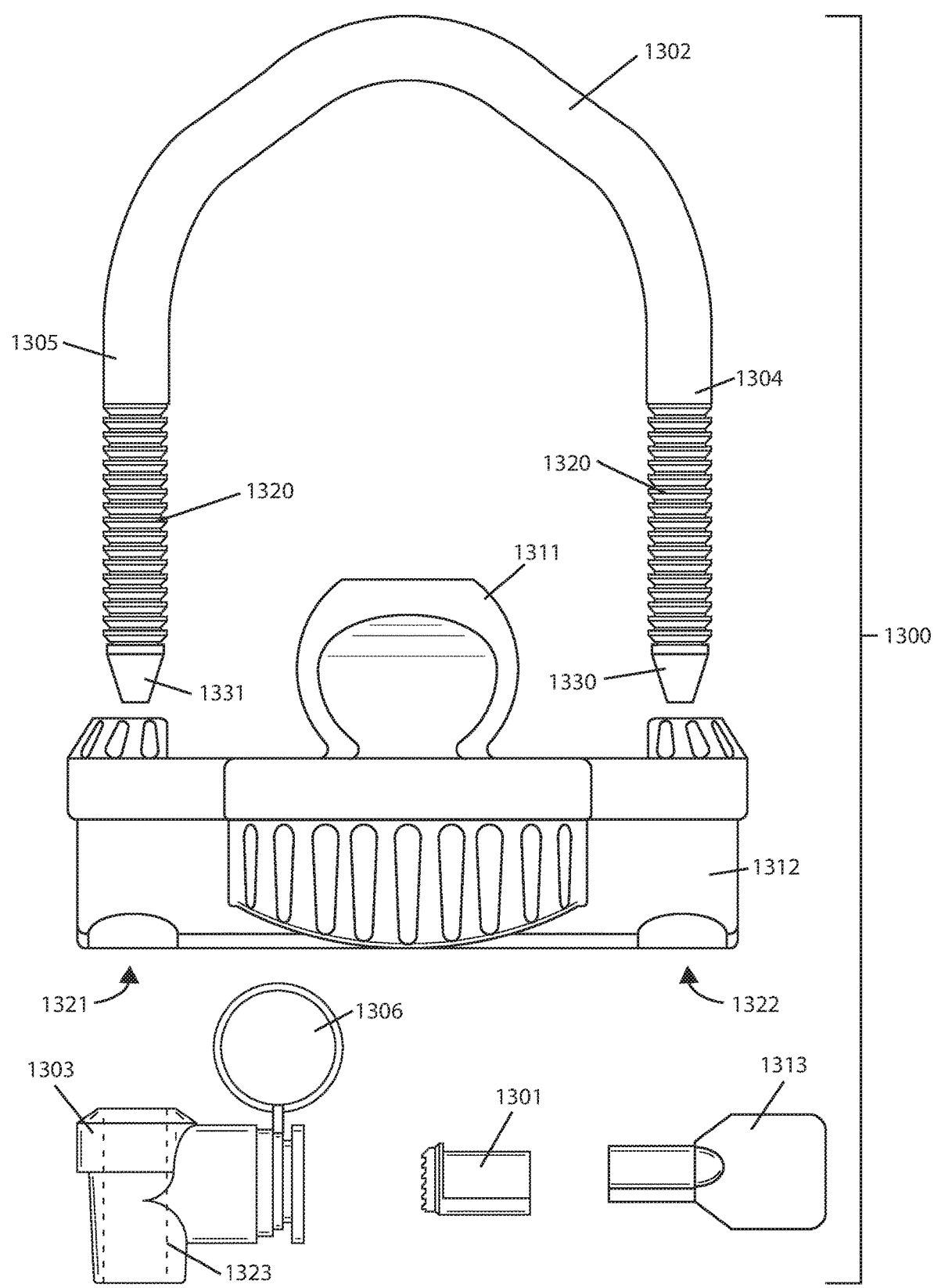
FIG. 13 is an exploded view of a three piece lock 1300.

Referring next to FIG. 2 the two piece mode lock is designated 20. The lock assembly 12 slides up the U-shaped shackle 2 and is locked as shown in FIGS. 12 and 13. FIG. 3 shows the plug platform 6 not in use when the two piece mode lock 20 is in use.

Figure 4:
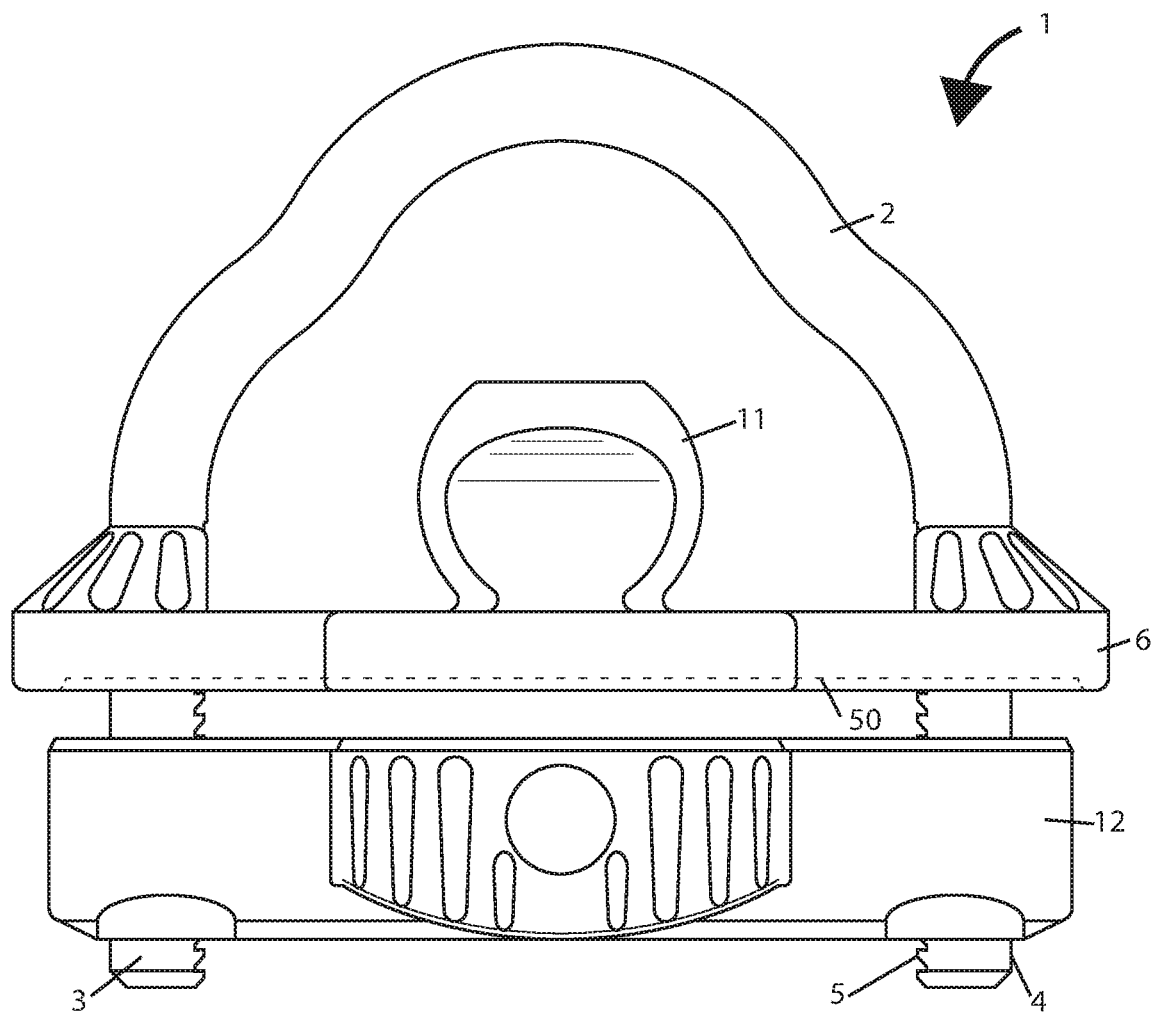
FIG. 4 is a front elevation view of the three component first mode of the lock being coupled together.

Referring next to FIG. 4 the user has slid the plug platform 6 up the legs 3,4. The user has started to slide the lock body 12 up the legs. U.S. Pat. No. 7,121,121, FIG. 1, is incorporated herein by reference to teach the customary positioning of a plug in a recess of a hitch.

Referring next to 5 the user has pushed the lock body 12 snug against the plug platform 6. Optionally a recess 50 in the plug platform captures a top segment of the lock assembly 12. Nominal dimensions include $d12=44.2$ mm.

Figures 6, 7:
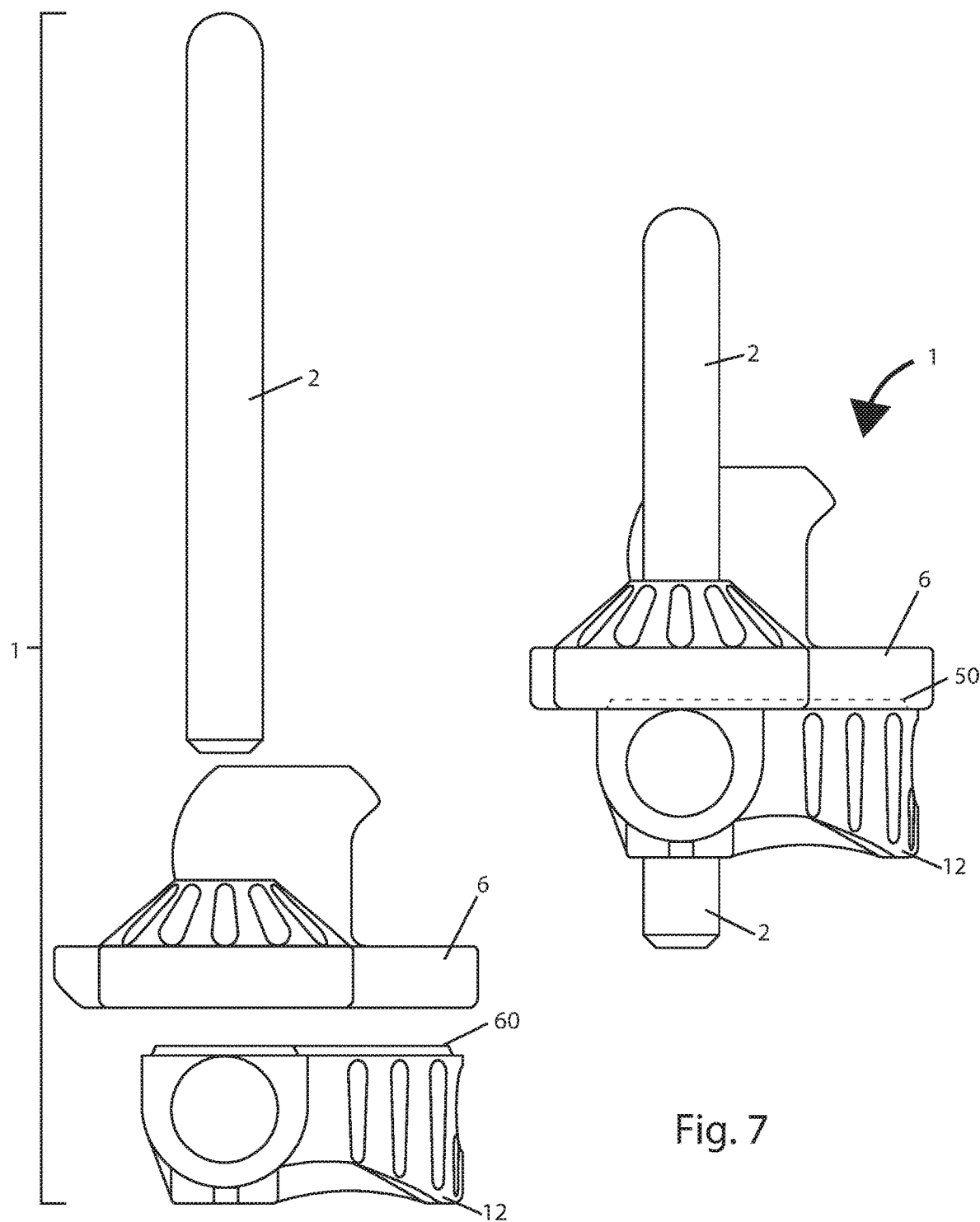
FIG. 6 is a left side exploded view of the three component first mode of the lock.
FIG. 7 is a left side assembled view of the three component first mode of the lock.

Referring next to FIGS. 6,7 the top of the lock is shown with an optional tapered roof 60 to fit into the recess 50.

Figure 5:
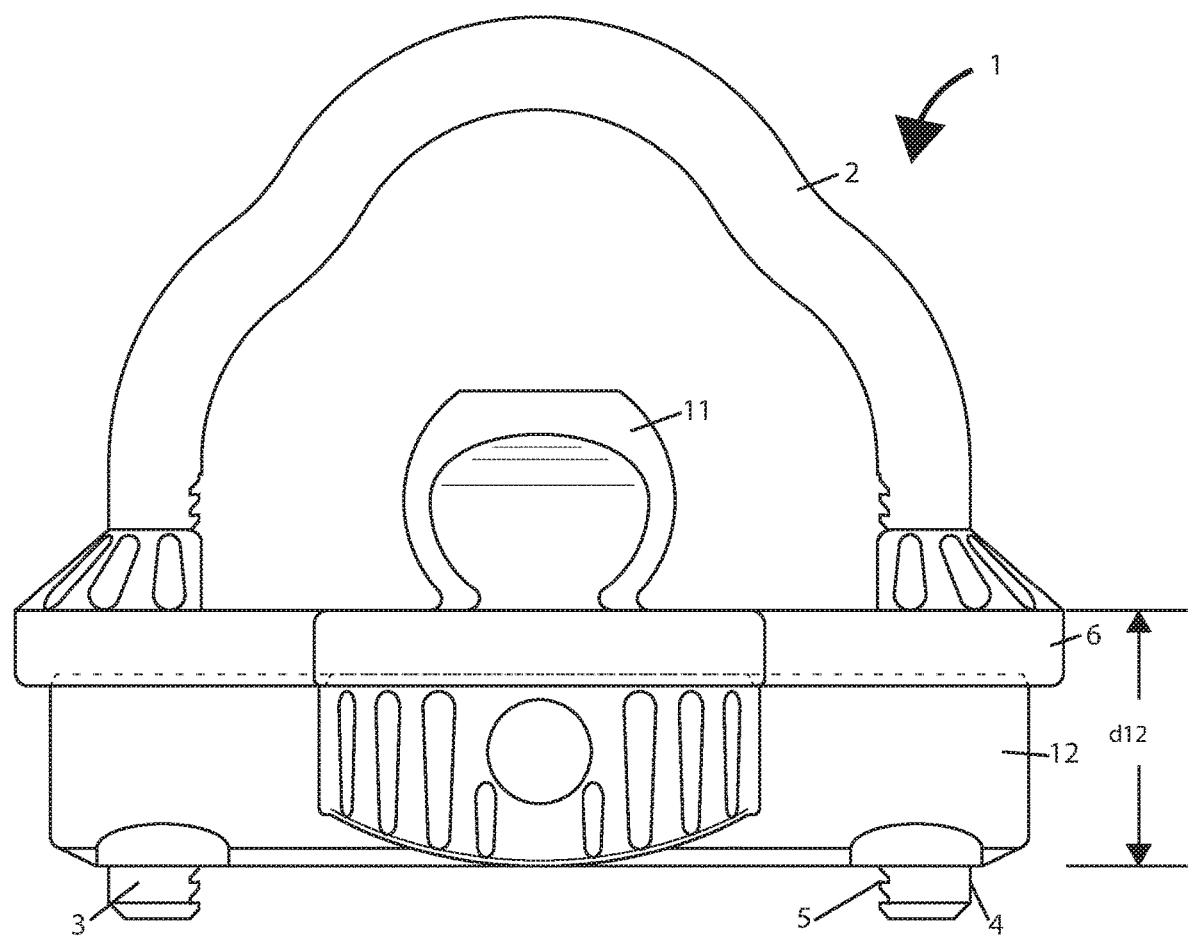
FIG. 5 is a front elevation view of the three component first mode of the lock in full lock mode.
Figure 8:
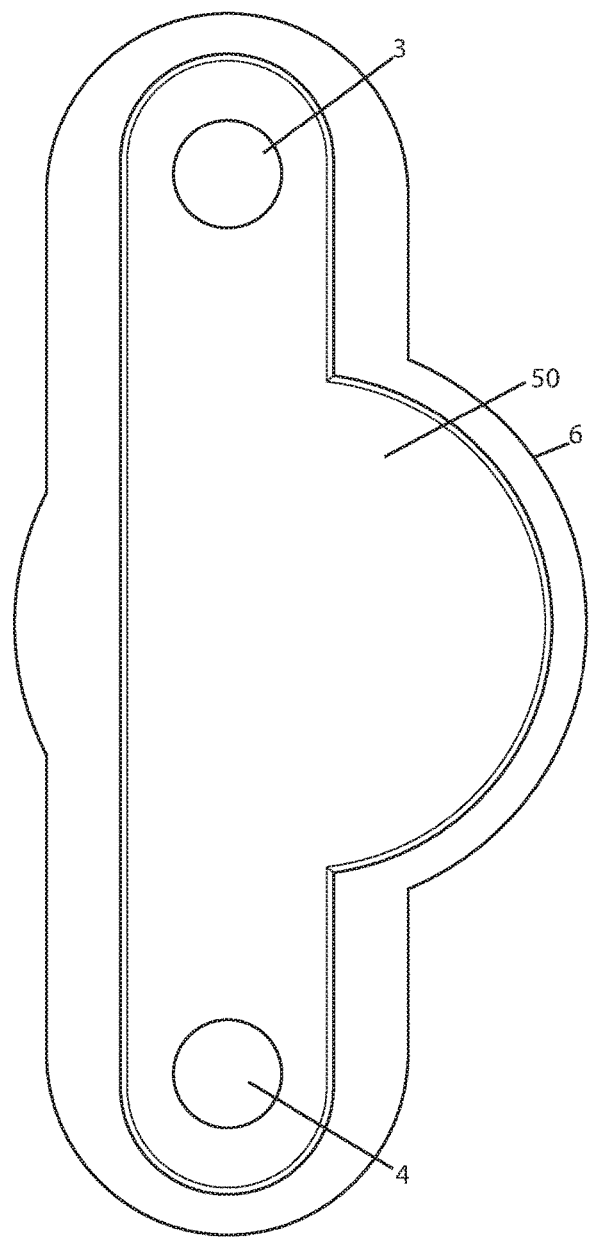
FIG. 8 is a bottom plan view of the embodiment shown in FIG. 4.
Figure 9:
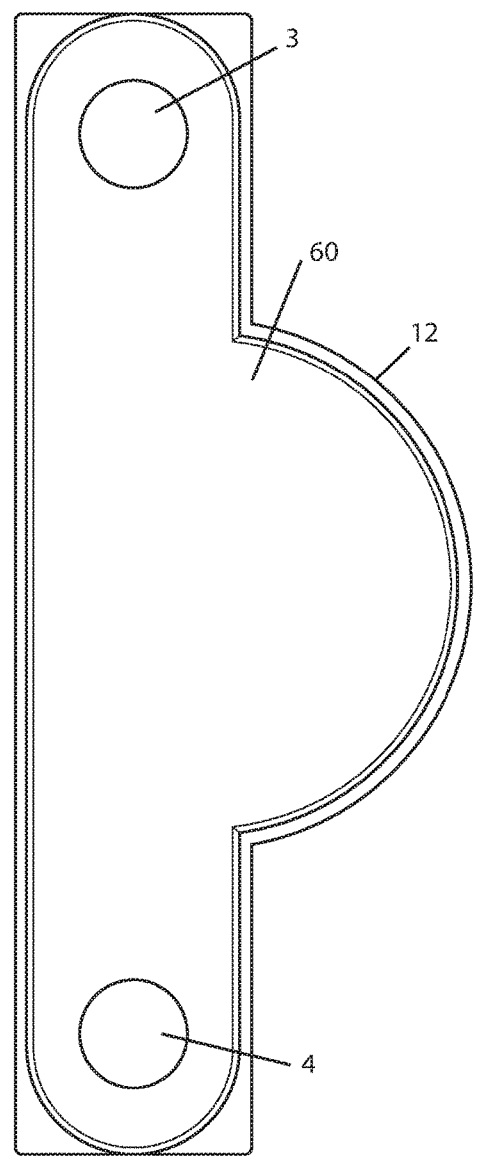
FIG. 9 is a top plan view of the embodiment shown in FIG. 4.

FIG. 8 shows a bottom plan view of the embodiment shown in FIG. 5. FIG. 9 shows a top plan view of the embodiment shown in FIG. 5.

Referring next to FIG. 10 the lock assembly has the following parts:
 cam lock hole—1000
 cam lock—1001
 lock core—1002
 key cover—1003
 key cover clip—1004
 bolt—1005
 lock core hole—1006
 lock core—1007 having a diameter 100
 core hole—1008
 jaw rods (two)—1009
 spring (two) 1010
 locking jaw (two)—1011
 press pin (two)—1012
 jaw teeth—555
 key—1013

Figure 11A:
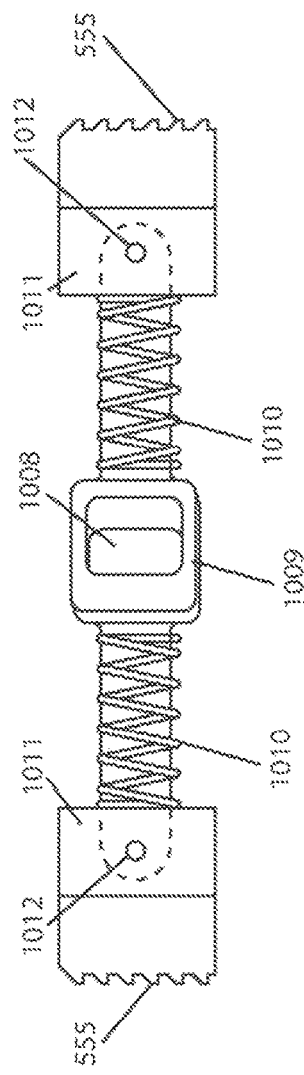
FIG. 11A is a top plan view of the transverse lock components.

Referring next to FIG. 11A the locking jaws 1011 have meshing teeth 555 to engage the grooves 5 of legs 3,4 shown in FIG. 1.

Figure 11B:
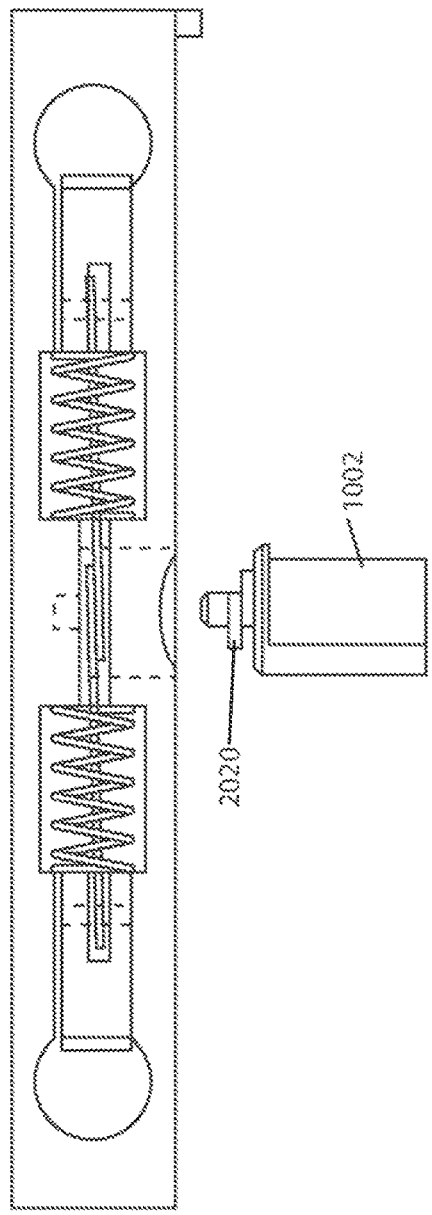
FIG. 11B is a cross sectional exploded view of the lock assembly.
Figure 11C:
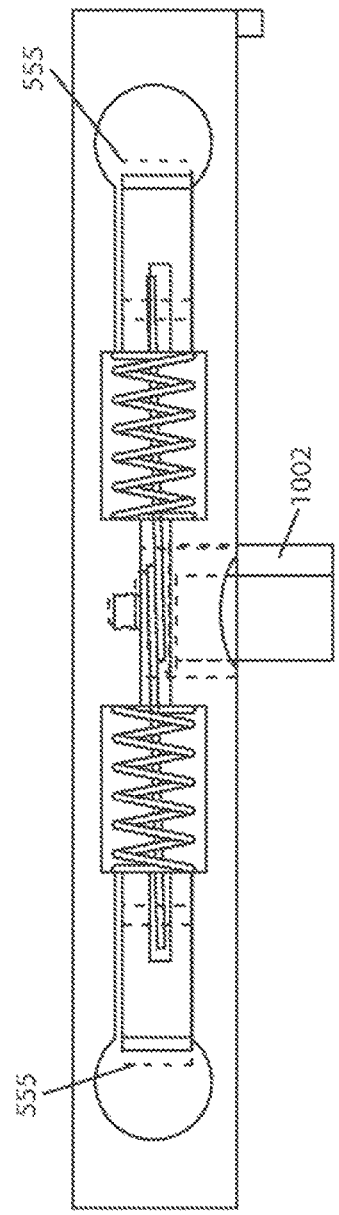
FIG. 11C is a cross sectional view of the lock assembly in use.

Referring next to FIGS. 11B, 11C when the key 1013 (FIG. 10) turns the cam 2020, the jaw rods 1009 are urged inbound allow holes 13, 14 to be clear to receive legs 3, 4. After legs 3, 4 are in holes 13, 14 the key 1013 is turned to allow springs 1010 to maintain the jaw teeth 555 engaged in the grooves 5. FIG. 11C shows the jaw teeth 555 in dots in the locked position.

FIG. 12 shows the lock 20 of FIG. 2 locking a motorcycle tire 1200.

FIG. 13 shows a lock 1300. The U shaped shackle 1302 has legs 1304, 1305, either or both legs have locking grooves 1320. The base 1312 has a plug 1311, equivalent to plug 11 of FIG. 1.

The legs 1304, 1305 slide through holes 1322, 1321. Either tip 1330 or 1331 receiver a lock 1303 through lock hole 1323. A key 1313 locks/unlocks the jaw teeth 1301 to the grooves 1320. A rubber washer 1306 snaps over the lock 1303.

While a number of exemplifying features and embodiments have been discussed above, those of skill in the art will recognize certain modifications, permutations, additions and subcombinations thereof. No limitation with respect to the specific embodiments disclosed herein is intended or should be inferred.

I claim:

1. A multi-function lock comprising:
  a shackle having a pair of parallel legs;
  at least one member of the pair of parallel legs having locking grooves;
  a plug platform having a central plug sized to fit in a trailer hitch recess;
  said plug platform having a left and a right through hole to receive the pair of parallel legs and having a bottom surface;
  a lock body having a left and a right through hole to receive the pair of parallel legs; and
  said lock body having a key controlled lock assembly that projects a lock jaw with locking teeth into at least one hole of the left and right through holes to lock the lock body on the shackle, wherein said plug platform is formed separate from said lock body such that said plug platform is removable from said shackle such that said lock body can be attached to said shackle without said plug platform thereby providing a lock enclosure between the shackle and a top of the lock body.

2. The multi-function lock of claim 1, wherein the plug platform is mounted on the shackle with the plug facing upward, the lock body is mounted under the plug platform, the lock body is lockable in contact with the bottom of the plug platform, thereby providing a lock enclosure between the shackle and the plug.

3. The multi-function lock of claim 2, wherein each member of the pair of parallel legs further comprises locking grooves.

4. The multi-function lock of claim 3, wherein the key controlled lock assembly further comprises a pair of extendable jaw rods, each jaw rod having a lock jaw with locking teeth, and the key turns a cam that moves the pair of extendable jaw rods from a locked to the shackle to an unlocked from the shackle mode.

5. The multi-function lock of claim 4, wherein the key controlled lock assembly further comprises a cylindrical body received in a side hole of the lock body.

6. The multi-function lock of claim 2, wherein a top of the lock body has a roof that nests in a recess on the bottom of the plug platform.

7. The multi-function lock of claim 1, wherein the shackle has a U shape.

8. A multi-mode shackle style lock comprising:
  a U shaped shackle having a pair of parallel legs;
  at least one member of the pair of parallel legs having locking grooves;
  a lock body having a key controlled lock assembly that projects a lock jaw into and out of a through hole to engage and disengage the locking grooves;
  said lock body having a pair of through holes to receive the pair of parallel legs;
  wherein a first lock enclosure is formed between the shackle and a top of the lock body when the lock jaw is engaged with the locking grooves;
  a plug platform formed separate from said lock body, said plug platform having a central plug sized to fit into a trailer hitch recess and having a pair of through holes to receive the pair of descending parallel legs; and
  said plug platform mounted to the shackle above the lock body such that said plug platform is positioned between said lock body and a curve of said U shaped shackle, wherein said plug platform is removable from said shackle by removing said lock body from said shackle such that said lock body and said shackle form said first lock enclosure independent of said plug platform.

9. The multi-mode shackle style lock of claim 8, wherein both members of the pair of descending parallel legs having locking grooves.

10. The multi-mode shackle style lock of claim 9, wherein the key controlled lock assembly further comprises a lock jaw for each of its through holes, and the key moves the pair of lock jaws from a locked against the locking grooves mode to an unlocked mode.

11. The multi-mode shackle style lock of claim 10, wherein the lock assembly further comprises a cam that extends and retracts a pair of jaw rods that carry the lock jaws.

12. The multi-mode shackle style lock of claim 11, wherein the plug platform further comprises a pair of shoulders above its through holes.

13. The multi-mode shackle style lock of claim 11, wherein a top of the lock body has a roof that fits into a recess of a bottom of the plug platform.

14. A dual purpose shackle lock comprising:
  a U shaped shackle having a pair of descending parallel legs;
  at least one leg configured to receive a retractable lock of a lock body;
  wherein said lock body comprising a pair of through holes to receive the pair of descending parallel legs and a key controlled lock assembly configured to move the retractable lock member from a locked to an unlocked mode;
  a first lock enclosure formed between the shackle and a top of the lock body when the key controlled lock assembly is in the locked mode;
  a plug platform positioned between said lock body and a curve of said U shaped shackle, wherein said plug platform is removable from said shackle by removing said lock body from said shackle such that said lock body and said shackle form said first lock enclosure independent of said plug platform, wherein said plug platform and said lock body being mounted to said parallel legs via said pair of through holes receiving the pair of descending parallel legs in said lock body and a pair of through holes in said plug platform;
  wherein said plug platform having a central plug extending from said plug platform and being configured to fit into a trailer hitch recess.

15. The dual purpose shackle lock of claim 14, wherein a bottom of the plug platform further comprises a dowel pin that fits into a hole in a top of the lock body when the lock body is in contact with the plug platform.

16. The dual purpose shackle lock of claim 14, wherein each leg of the pair of descending legs is configured to receive a retractable lock member.

* * * * *